United States Patent [19]
Loran

[11] Patent Number: 5,638,868
[45] Date of Patent: Jun. 17, 1997

[54] ACCUMULATOR

[75] Inventor: Haim Loran, Millington, N.J.

[73] Assignee: Valcor Engineering, Springfield, N.J.

[21] Appl. No.: 660,676

[22] Filed: Jun. 5, 1996

[51] Int. Cl.⁶ ............................................... F16L 55/04
[52] U.S. Cl. ........................................ 138/31; 138/30
[58] Field of Search ......................... 138/31, 30, 26; 220/721

[56] References Cited

U.S. PATENT DOCUMENTS

| | | | |
|---|---|---|---|
| 2,745,357 | 5/1956 | Strayer | 103/223 |
| 3,336,948 | 8/1967 | Lucien | 138/31 |
| 4,461,322 | 7/1984 | Mills | 138/31 |
| 4,601,369 | 7/1986 | Hattori et al. | 192/3.58 |
| 4,610,369 | 9/1986 | Mercier | 138/30 X |
| 4,691,739 | 9/1987 | Gooden | 138/31 |
| 4,852,615 | 8/1989 | Still | 138/30 |
| 4,959,958 | 10/1990 | Nishikawa et al. | 138/30 X |
| 4,997,009 | 3/1991 | Niikura et al. | 138/31 X |
| 5,009,066 | 4/1991 | VanGorder et al. | 60/415 |
| 5,036,661 | 8/1991 | Gris | 138/30 X |
| 5,388,899 | 2/1995 | Volz et al. | 138/31 X |

*Primary Examiner*—David Scherbel
*Assistant Examiner*—Patrick F. Brinson
*Attorney, Agent, or Firm*—Anthony D. Cipollone

[57] ABSTRACT

An improved hydraulic accumulator is introduced wherein a valve mechanism is used to seal a hydraulic fluid before the pressure charged piston reaches the end of the accumulator to minimize the loss of compressed gas by eliminating the pressure differential when the piston is fully extended, thereby prolonging the fatigue life of the accumulator vessel. Reduction of the pressure loading on the vessel will also prolong the life of the piston seals and metal bellows effectively extending the accumulator life and effectively allowing design for weight reduction and preservation of the integrity of the complete hydraulic or pneumatic system.

2 Claims, 4 Drawing Sheets

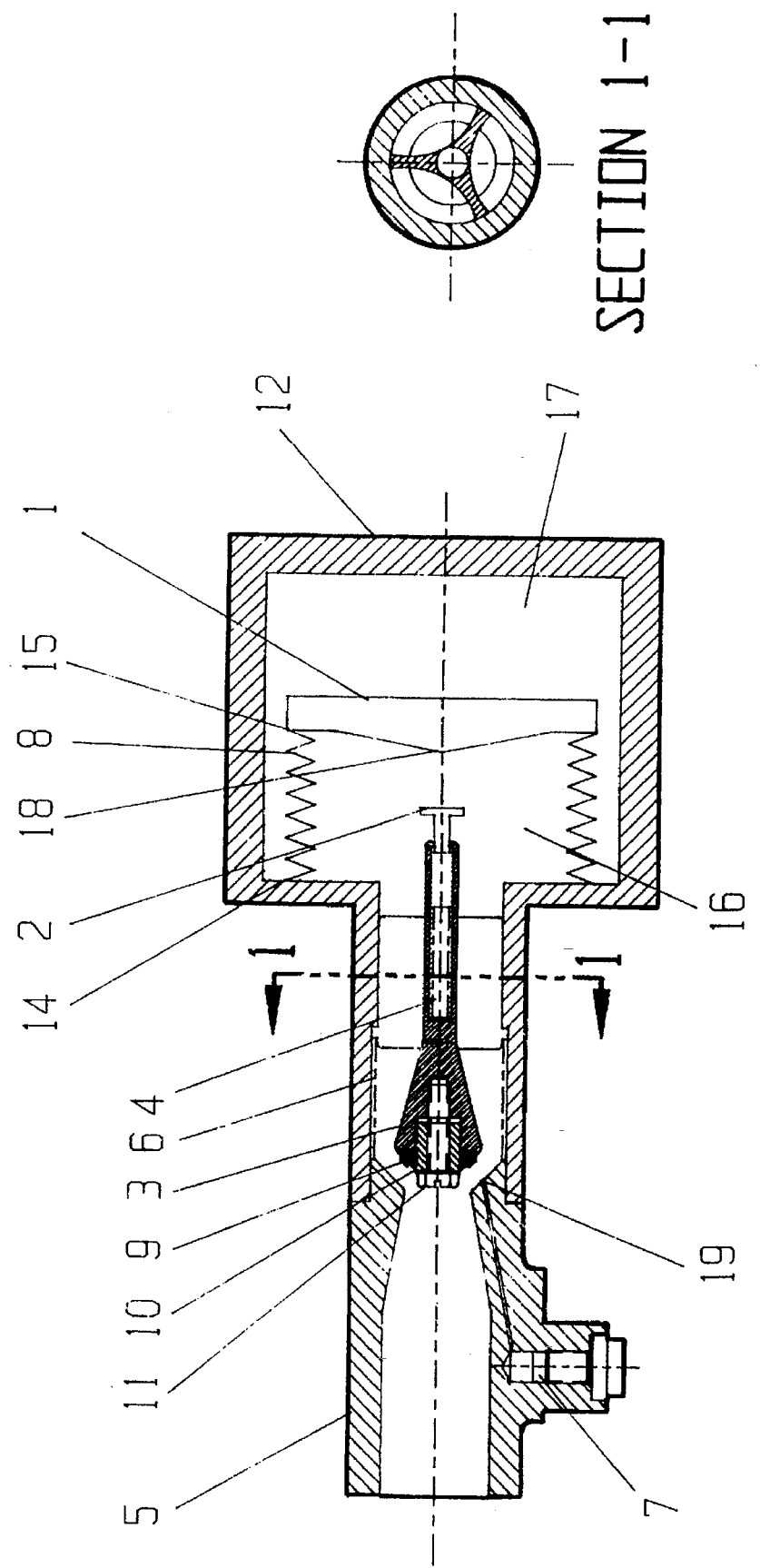

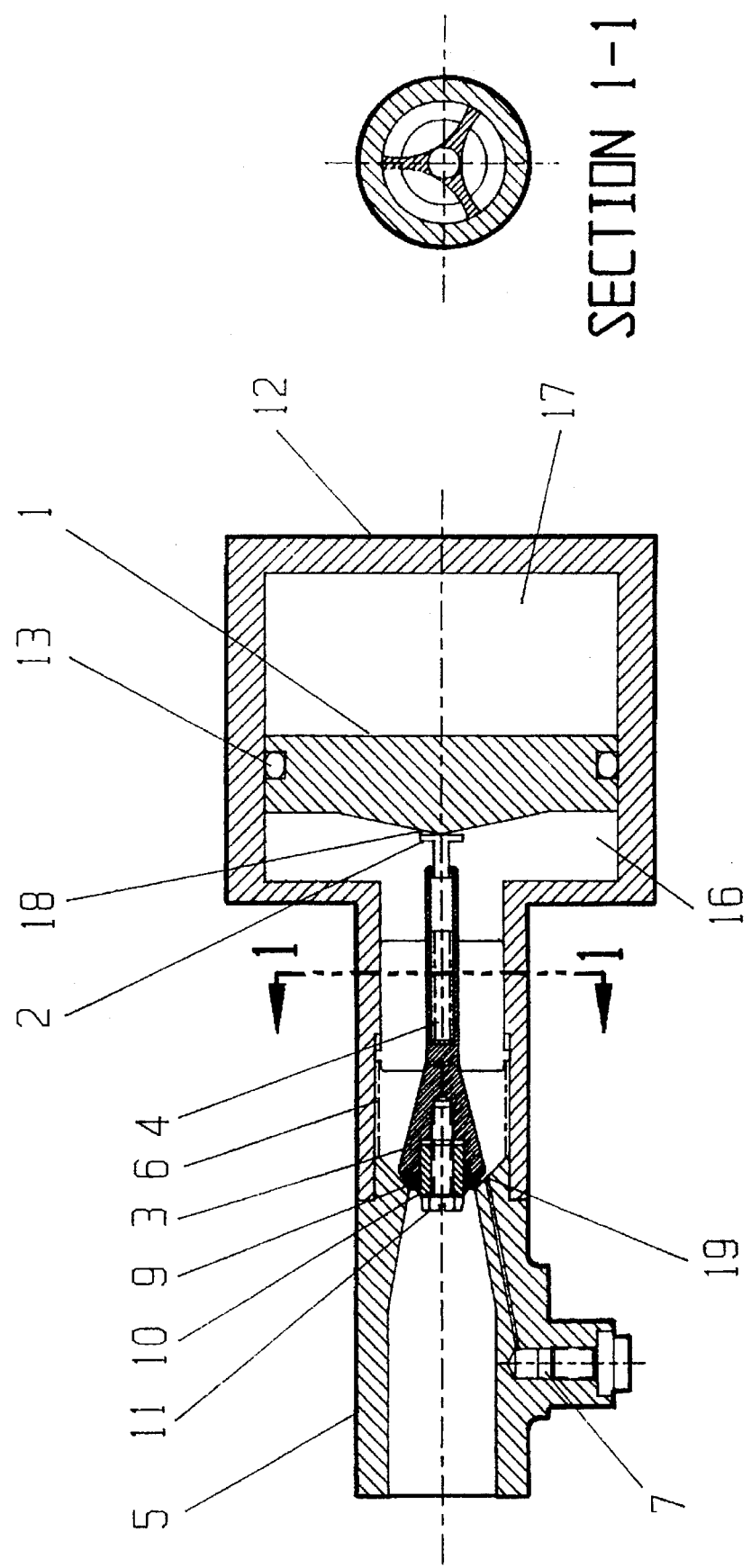

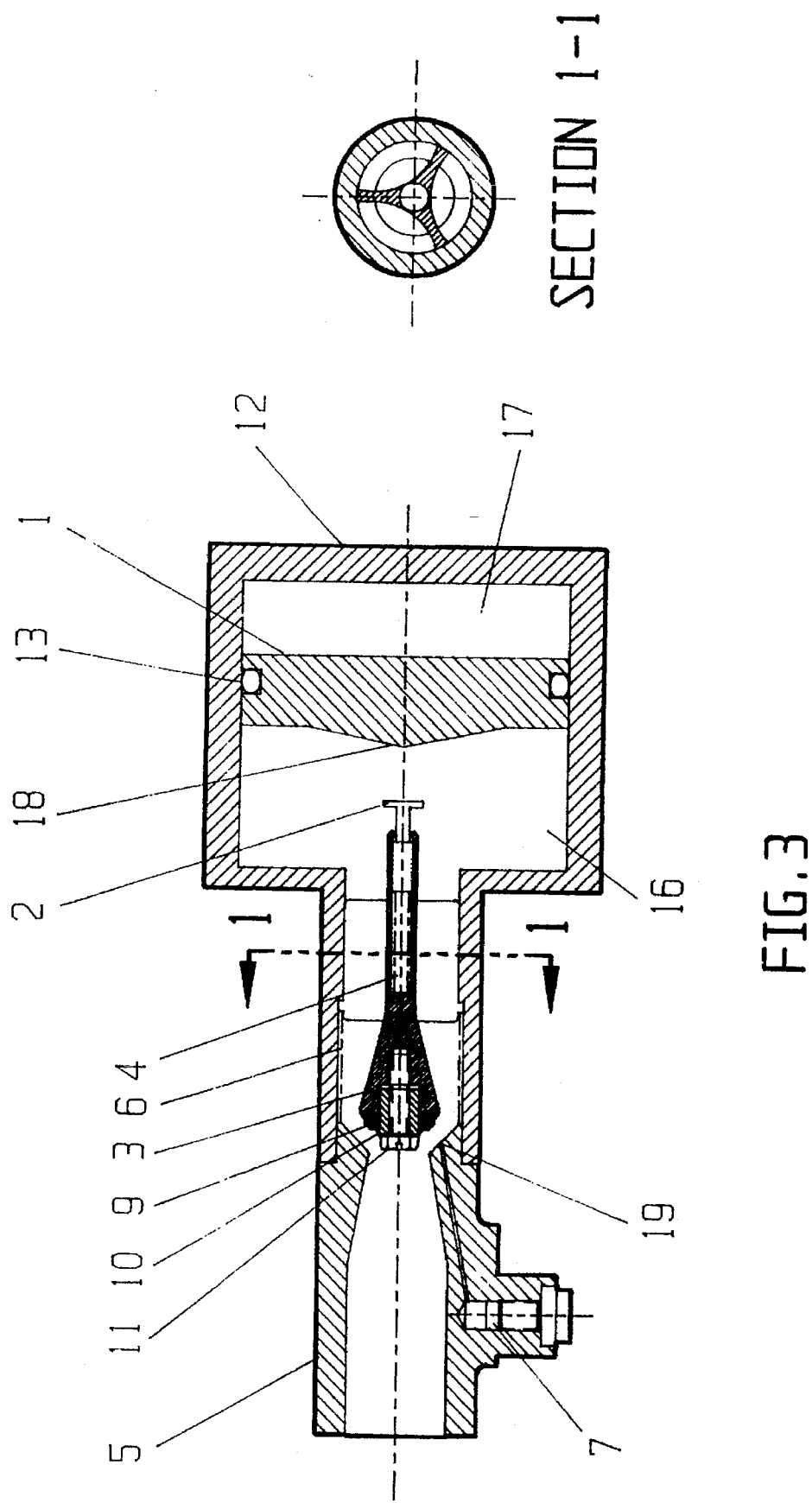

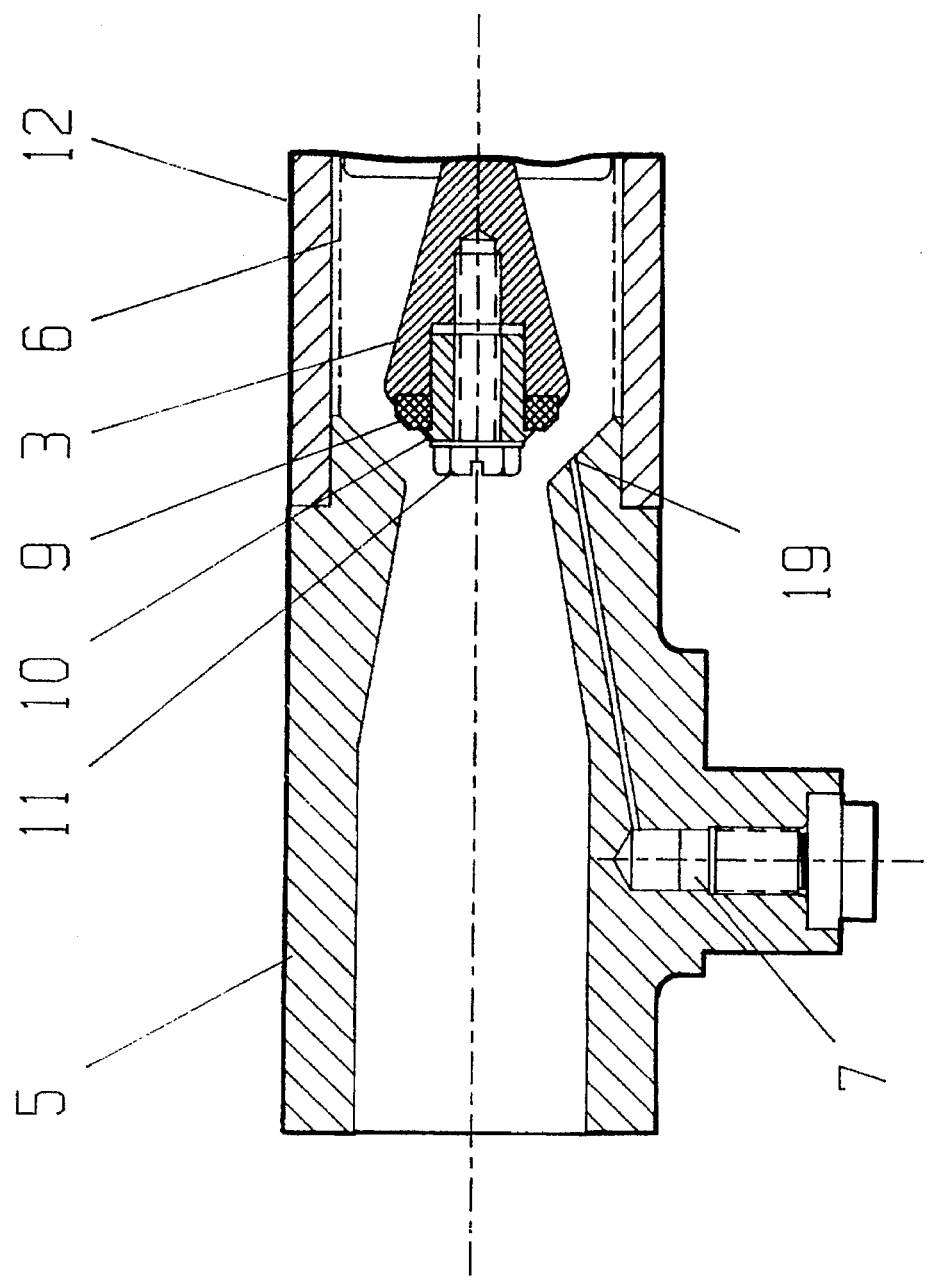

ACCUMULATOR

BACKGROUND & FIELD OF THE INVENTION

1. Field of the Invention

When hydraulic accumulators discharge their working fluid, the dynamic gas/fluid separating device, consisting of a bellows or piston, is placed in a condition of high steady state stress. This stress is due to the force created by the gas pre-charge pressure present or on the side of the separator and the actual lower-working pressure on the expelled fluid side. Further, high point contact loads may exist where the separator mechanically stops on the accumulator vessel structure.

The foregoing conditions must be considered by the designer, especially in high performance driven applications where weight of the unit and operating life are major factors. One factor must be compromised with the other.

2. Description of Prior Art a) U.S. Pat. No. 2,745,357 introduces an aircraft hydraulic system with an improved pressure type reservoir.
b) U.S. Pat. No. 4,601,369 describes a pressure vessel.
c) U.S. Pat. No. 4,852,615 teaches a hydropneumatic accumulator with two chambers.
d) U.S. Pat. No. 4,959,958 shows a hydraulic pressure system for supplying a fluid under pressure in combination with a gas chamber.
e) U.S. Pat. No. 4,997,009 is an accumulator with metallic bellows and a self-seal mechanism.
f) U.S. Pat. No. 5,009,066 deals with an automotive power steering system.
g) U.S. Pat. No. 5,036,661 shows a regulated level accumulator for liquid under high pressure.

SUMMARY OF THE INVENTION

A valve mechanism is introduced in conjunction with an accumulator piston and vessel, the piston acting as a separator to separate liquid from gas components. The valve mechanism is so designed as to sense the relative position of the piston.

The valve mechanism will limit the expelled fluid volume of the accumulator to obtain pressure equilibrium across the piston (separator). This action of the valve mechanism reduces the pressure differential and forces across the piston causing the high, steady stress levels of the piston, eliminating the high contact loads on the static housing. The valve mechanism will limit the expelled fluid near the time of complete discharge such that the fluid pressure will not be below the gas pre-charge pressure. This mechanism may be used in a static vessel, dynamic piston (separator) or as a separate system interfacing with the accumulator.

Localized high stressed concentrations in either the fluid separator or the surrounding shell resulting from the piston (separator) being bottomed on the hydraulic end of the shell causes fatigue and a short life span for the shell.

Accumulators are used for two separate functions in the standard hydraulic system. The first is to store energy in the form of compressed gas and hydraulic fluid. The second is to absorb pressure spikes which occur when a component in the hydraulic system actuates or performs work. Both of these applications require the use of a compressible fluid (gas, i.e. nitrogen, helium, air etc.) on one side of a separator and a non-compressible fluid (hydraulic oil) on the other side. When the hydraulic system pressure drops below the pre-charged pressure of the gas side, the separator will move in the direction of the hydraulic side, displacing stored hydraulic fluid into the system as required. When the hydraulic system is shut down, the separator goes to the full stroke stopped position and you are left with the full pre-charge pressure being applied to the area of the separator creating a force which acts on the separator and thereby inducing a stress in this member. When fully bottomed, this load is also applied to through the stopping mechanism which in turn creates a localized high stress area in the shell. With both of the above, the noted stresses can be addressed by material selection and/or material thickness and physical geometry. Typically, both of these approaches can add considerable weight to the final design solution and, in many cases, reduce the entire overall performance, as a result of the weight penalty,of the entire operating system.

The present approach is to capture enough fluid in the hydraulic side of the accumulator to keep the separator from just short of its bottoming position, thereby equalizing the pressure on both sides of the separator which will, in turn, reduce the stress levels attributable to the pressure loading of the separator. This will also prevent the separator from physically bottoming on the hydraulic shell, resulting in a uniformly distributed pressure loading of the hydraulic shell.

BRIEF DESCRIPTION OF THE DRAWINGS

FIG. 1. Cross section of the accumulator using bellows as a separator of gas & fluid chambers.

FIG. 2. Cross section of alternative accumulator design using piston as a separator of gas & fluid chambers showing poppet in sealed position.

FIG. 3. Cross section of alternative accumulator design using piston as a separator of gas & fluid chambers showing poppet in the open position.

FIG. 4. Cross section detail of tail end of poppet in the open position.

DETAILED DESCRIPTION OF THE PREFERRED EMBODIMENT OF THE INVENTION

The first embodiment of the invention is shown in FIG. 1 and FIG. 4 and will now be described.

This embodiment is the preferred embodiment of the invention. It is important to note that the poppet described in FIGS. 1, 2, 3, 4, 6, 9, 10 and 11 is the point of invention. The addition of this poppet to the accumulator design permits control of the expelled fluid such that the fluid side pressure will not be below the gas pre-charge pressure. This valve sealing mechanism will allow the piston to travel to a position of pressure equilibrium and will prevent contact loads from being transferred to the vessel permitting the sealing prior to the piston achieving the fully stroked position, eliminating contact stress with the vessel.

Referring to FIG. 1, as the pressure in the hydraulic system exceeds the gas pressure, the return spring (6) will apply force to the valve mechanism to return it to an open position. The return spring (6) is attached to poppet (3) which when opened allows hydraulic flow into the liquid chamber (16) compressing the gas in the gas chamber (17) of the accumulator chamber (12). This hydraulic flow expands the bellows (8) moving the protruding center (18) of the rear wall of the piston (1) away from the contact pin (2) of the poppet (3) compressing the gas in the gas chamber (17). Referring to FIG. 2, as the piston (1) strokes to a predetermined position or gas volume in the gas chamber (17) its protruding center (18) contacts the contact pin (2)

which then compresses the contact pin spring (4) forcing the poppet (3) to seal the fluid chamber with the poppet seal (9) held by seal retainer (10) with the seal retainer screw (11) to the poppet (3) seals the fluid chamber by coming into contact with the shoulders (19) of the valve seat (5). On the lower portion of the valve seat (5) is a pressure test port (7) which is used to check the hydraulic pressure of the system and whether the poppet seal (9) is properly sealed. At full discharge of the accumulator, the hydraulic pressure between the poppet seal (9) and the piston (1) in the liquid chamber (16) equals the pressure in the gas chamber (17).

An alternative embodiment of the invention is demonstrated in FIG. 2 and FIG. 3. Therein, bellows are replaced by the piston (1). The piston (1) acts as a separator between the liquid chamber (16) and the gas chamber (17) with the piston (1) flush with the interior walls of the accumulator housing (12), sealed by 0 ring (13). The principles and operation of the accumulator so designed is the same with the exception of the replacement for the bellows (8).

FIG. 2 shows the poppet seal, in the closed position, with the (9) seal and seal retainer (10) resting on the "shoulders" (19) of the seat valve to stop the fluid flow to the liquid chamber (16) when the pressure in the liquid chamber (16) is equal to the pressure in the gas chamber (17).

FIG. 4 is a cut away portion of the poppet (3) in its open position to allow fluid to flow into the liquid chamber (16) wherein the return spring (6) is acting in opposition to compression spring (4) pushing out the contact pin (2) to push out piston (1) to compress the gas in the gas chamber (17). Also shown are the seal retainer (10) and seal (9) on the poppet (3) held together by seal retainer screw (11) away and from the "shoulders" (19) of the seat valve (5) in the open position.

DETAILED ADVANTAGE & UNIQUE POINTS OF THE INVENTION

The point of present invention is the introduction of the poppet valve design to seal the fluid chamber prior to the piston reaching the fully stroked position. This unique design prevents the piston from being subjected to the full pre-charge load during cycling.

An additional benefit of this valve mechanism is the establishment of an equilibrium position with the spring loaded poppet valve design providing an integral pressure relief feature due to pressure changes associated with temperature changes in the system.

The foregoing features introduced by this unique poppet valve system decrease fatigue and wear and tear on the system, thereby increasing the longevity of the accumulator.

What is claimed is:

1. An accumulator comprising:
   a) a hollow housing;
   b) a bellows located inside the housing, said bellows including a bellows body having a first end and a second end, said first end being secured to the housing and second end allowed to move in an axial direction of the housing;
   c) a bellows attachment to a piston with a protruding center in its rear for closing the second end of the bellows body;
   d) a liquid chamber defined by the inner face of the bellows and filled with a liquid;
   e) a gas chamber defined by the outer face of the bellows body and said piston with a rear protruding center and charged with a compressed gas;
   f) a tube seat having a liquid flow port communicating with the liquid chamber and allowing liquid in the liquid chamber to pass when the bellows is compressed or expanded and a first set of shoulders at forward end of said tube seat;
   g) a self-seal mechanism comprising a shaft with an arrow-shaped poppet having an outer tail end in an axial position opposite a contact pin directly opposite said rear protruding center of said piston which has a second set of shoulders which comes into contact with said first set of shoulders on said forward end of tube seat when said pin is compressed when gas in said chamber forces said piston to make contact with said contact pin;
   h) said contact pin in the shaft of said arrow-shaped poppet connected to a compressible inner spring to force an outer spring attached to said outer tail end of said poppet in an axial position opposite said contact pin to be compressed when said piston is in contact with said contact pin pushing said outer tail end of poppet to sent on said tube seat with a seal retainer and seal on said tail end of said poppet to cause liquid flow to stop flowing into liquid chamber;
   i) said self-seal mechanism for closing the said liquid flow port when the pressure changes of the compressed gas in the gas chamber forces the bellows to be deformed in its axial direction to a predetermined extent, part of the liquid in the liquid chamber being confined to a region inside the bellows when the said self-seal mechanism is closed by the action of the said piston coming into contact with said contact pin of said poppet;
   j) said second set of shoulders of said shaft having a seal retainer and seal which comes into contact with and sits on said first set of shoulders of said tube seat to prevent liquid flow into the now sealed liquid chamber;
   k) said self-seal mechanism also comprising outer spring which will compress in an axial direction opposite said inner spring and will compress said inner spring allowing hydraulic flow pressure from the liquid to open said seal and permit bellows to expand pushing the piston forward to compress gas in said gas chamber.

2. An accumulator comprising:
   a] a hollow housing;
   b] a piston inside the housing; said piston being flush with the interior wall of said housing sealed by an "O" ring;
   c] said piston separating a gas chamber from a liquid chamber;
   d] said liquid chamber defined by the interior wall of the housing and a rear side of said piston;
   e] said gas chamber defined by the interior wall of said housing and a forward side of said piston and charged with compressed gas;
   f] said piston having a protruding center portion on its real wall in said liquid chamber;
   g] a tube seat having a liquid flow port communicating with the liquid chamber and allowing liquid in the liquid chamber, said tube seat having a first set of shoulders at a forward end of said tube seat;
   h] a self-seal mechanism comprising a shaft with an arrow-shaped popper having an outer tail end in an axial position opposite a contact pin directly opposite said rear protruding center of said piston which has a second set of shoulders which come into contact with said first set of shoulders on said forward end of the tube seat when said pin is compressed when gas in said chamber forces said piston to make contact with said contact pin;

i] said contact pin in the shaft of said arrow-shaped popper is connected to a compressible inner spring to force an outer spring attached to said outer tail end of said popper in an axial position opposite said contact pin to be compressed when said piston is in contact with said contact pin pushing said outer tail end of popper to seat on said tube seat with a seal retainer and seal on said tail end of said popper to cause liquid flow to stop flowing into said liquid chamber;

j] said self-seal mechanism for closing the said liquid flow port when the pressure changes of the compressed gas in the gas chamber forces the piston to move in the axial direction to a predetermined extend, part of the liquid in the liquid chamber being confined to a region inside the accumulator when the self-sealed mechanism is closed by the action of the said piston coming into contact with said contact pin of said poppet;

k] said second set of shoulders of said shaft having a seal retainer and seal which comes into contact with and sits on said first set of shoulders of said tube seat to prevent liquid flow into the now sealed liquid chamber;

l] said self-seal mechanism also comprising outer spring which will compress in an axial direction opposite said inner spring and will compress said inner spring allowing hydraulic flow pressure from the liquid to open said seal and permit the liquid chamber to be pressurized pushing the said piston forward to compress gas in said gas chamber.

* * * * *